US006715084B2

(12) United States Patent
Aaron et al.

(10) Patent No.: US 6,715,084 B2
(45) Date of Patent: Mar. 30, 2004

(54) FIREWALL SYSTEM AND METHOD VIA FEEDBACK FROM BROAD-SCOPE MONITORING FOR INTRUSION DETECTION

(75) Inventors: Jeffrey A. Aaron, Atlanta, GA (US); Thomas Anschutz, Conyers, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 28 days.

(21) Appl. No.: 10/108,078

(22) Filed: Mar. 26, 2002

(65) Prior Publication Data

US 2003/0188191 A1 Oct. 2, 2003

(51) Int. Cl.[7] .......................... G06F 11/30; G06F 12/14; H04L 9/00
(52) U.S. Cl. ........................ 713/201; 713/200; 709/235
(58) Field of Search ................................. 713/200, 201

(56) References Cited

U.S. PATENT DOCUMENTS

| | | | |
|---|---|---|---|
| 5,621,889 A | 4/1997 | Lermuzeaux et al. | 395/186 |
| 5,784,569 A * | 7/1998 | Miller et al. | 709/235 |
| 5,826,014 A | 10/1998 | Coley et al. | 395/187.01 |
| 5,892,903 A | 4/1999 | Klaus | 395/187.01 |
| 5,931,946 A | 8/1999 | Terada et al. | 713/201 |
| 5,991,881 A | 11/1999 | Conklin | 713/201 |
| 6,026,502 A | 2/2000 | Wakayama | 714/38 |
| 6,061,798 A | 5/2000 | Coley et al. | 713/201 |
| 6,119,236 A * | 9/2000 | Shipley | 713/201 |
| 6,134,664 A | 10/2000 | Walker | 713/201 |
| 6,167,358 A | 12/2000 | Othmer et al. | 702/188 |
| 6,205,551 B1 * | 3/2001 | Grosse | 713/201 |
| 6,321,338 B1 * | 11/2001 | Porras et al. | 713/201 |
| 6,405,318 B1 * | 6/2002 | Rowland | 713/200 |
| 6,460,141 B1 * | 10/2002 | Olden | 713/201 |
| 6,513,122 B1 * | 1/2003 | Magdych et al. | 713/201 |

OTHER PUBLICATIONS

Julia Allen et al, "State of the Practice of Instrusion Detection Technologies" Jan. 2000, Carnegie Mellon University, pp. 1–220.*
Julia Allen et al, "A Safe Bet Cert Cercurity Practices" Summer 2001, IAnewsletter, vol. 4, No. 3, pp. 5–7.*
Security Focus HOME Tools Archive, wysiwg://22/http://www.security–portal.com/tools/categor.*

* cited by examiner

*Primary Examiner*—Ly V. Hua
(74) *Attorney, Agent, or Firm*—Woodcock Washburn LLP

(57) ABSTRACT

A broad-scope intrusion detection system analyzes traffic coming into multiple hosts or other customers' computers or sites. This provides additional data for analysis as compared to systems that just analyze the traffic coming into one customer's site. Additional detection schemes can be used to recognize patterns that would otherwise be difficult or impossible to recognize with just a single customer detector. Standard signature detection methods can be used. Additionally, new signatures can be used based on broad-scope analysis goals. An anomaly is detected in the computer system, and then it is determined which devices or devices are anticipated to be affected by the anomaly in the future. These anticipated devices are then alerted to the potential for the future anomaly. The anomaly can be an intrusion or an intrusion attempt or reconnaissance activity.

33 Claims, 5 Drawing Sheets

FIREWALL SYSTEM AND METHOD VIA FEEDBACK FROM BROAD-SCOPE MONITORING FOR INTRUSION DETECTION

FIELD OF THE INVENTION

The present invention relates in general to intrusion detection systems for computer systems and, more particularly, to network-based intrusion detection systems.

BACKGROUND OF THE INVENTION

Numerous present-day computer installations, be they provided with centralized processor units or be they organized in networks interconnecting geographically distributed processor units, have various access points for serving their users. The number of such points and the ease with which they are often accessible have the drawback of facilitating attempts at intrusion by people who are not authorized users and attempts by users of any kind, whether acting alone or in concert, to perform computer operations which such users should not be capable of performing legitimately. These unauthorized users are typically called "hackers" or "crackers".

Moreover, the open network architecture of the Internet permits a user on a network to have access to information on many different computers, and it also provides access to messages generated by a user's computer and to the resources of the user's computer. Hackers present a significant security risk to any computer coupled to a network where a user for one computer may attempt to gain unauthorized access to resources on another computer of the network.

In an effort to control access to a network and, hence, limit unauthorized access to computer resources available on that network, a number of computer communication security devices and techniques have been developed. One type of device which is used to control the transfer of data is typically called a "firewall". Firewalls are routers which use a set of rules to determine whether a data message should be permitted to pass into or out of a network before determining an efficient route for the message if the rules permit further transmission of the message.

One fundamental technique used by firewalls to protect network elements is known as "packet filtering". A packet filter may investigate address information contained in a data packet to determine whether the source machine, from which the packet originated, is on a list of allowed addresses. If the address is on the list, the packet is allowed to pass. Otherwise the packet is dropped. Packet filtering using lists of allowed protocols (e.g., file transfer FTP, web access HTTP, email POP) is also sometimes done, either alone or in combination with the more stringent address-based packet filtering method.

One problem with address-based packet filtering is that hackers have developed a technique known as "address spoofing" or "P spoofing" wherein address information within a fabricated packet is manipulated to bypass a packet filter (e.g., by placing the address information of a machine which is on the allowed list within the packet, even though the true source address which would normally be placed within the packet is different and disallowed). Address spoofing may also be used to make it appear that the packet originates in the network that the firewall protects, and thus is on a default allowed list.

An example of a conventional firewall arrangement is depicted in FIG. 1. A host computer 100 communicates with an institutional computer system 106 over a public network 102 through a router 104. A router is a network element that directs a packet in accordance with address information contained in the packet. The institutional computer system 106 supports a variety of applications including a Web server 108, and an e-mail system 114. A firewall system 110 with ports 111, 112, 113 is placed between the router 104 and the institutional computer 106. Port 112 connects an internal network 116 to the firewall 110, while ports 111 and 113 connect the public network 102 and the institutional computer 106, respectively. The internal network 116 may support communication between internal terminal(s) 118 and a database 120, possibly containing sensitive information. Such a firewall system 110, however, although intended to protect resources 118 and 120 connected to the internal network 116, is subject to attack in many ways.

A hacker operating the host computer 100 can utilize publicly accessible applications on the institutional computer system 106, such as the Web server 108 or the e-mail system 114, to attack the firewall system 110 or connect to the internal network port 112. The Web server 108 or the e-mail system 114 may have authority to attach to and communicate through the firewall system 110. The hacker might be able to exploit this by routing packets through, or mimicking these network elements, in order to attach to, attack, or completely bypass, the firewall system 110.

Most conventional firewalls, unless configured otherwise, are transparent to packets originating from behind the firewall. Hence, the hacker may insert a source address of a valid network element residing behind the firewall 110, such as the terminal 118, to a fictitious packet. Such a packet may then be able to pass through the firewall system 110. The hacker may even set the packet to be configured to contain a message requesting the establishment of a session with the terminal 118. The terminal 118 typically performs no checking itself, instead relying on the firewall, and assumes that such a session request is legitimate. The terminal 118 acknowledges the request and sends a confirmation message back through the firewall system 110. The ensuing session may appear to be valid to the firewall system 110.

The hacker can also initiate multiple attempts to attach to the port 111. Technically, a connection to the port is formed before the firewall 110 is able to filter the authority of the request. If enough connection requests hit the port 112, it may be rendered unavailable for a period of time, denying service to both incoming requests from the public network, and more importantly, denying access to the internal network 116 for outgoing messages. It is readily apparent that conventional firewall systems, such as the one depicted in FIG. 1, are unacceptably vulnerable in many ways.

Hackers have also developed other ways which may be helpful in bypassing the screening function of a router. For example, one computer, such as a server on the network, may be permitted to receive sync messages from a computer outside the network. In an effort to get a message to another computer on a network, a hacker may attempt to use source routing to send a message from the server to another computer on the network. Source routing is a technique by which a source computer may specify an intermediate computer on the path for a message to be transmitted to a destination computer. In this way, the hacker may be able to establish a communication connection with a server through a router and thereafter send a message to another computer on the network by specifying the server as an intermediate computer for the message to the other computer.

In an effort to prevent source routing techniques from being used by hackers, some routers (including some firewalls) may be configured to intercept and discard all source routed messages to a network. For a router configured with source routing blocking, the router may have a set of rules for inbound messages, a set of rules for outbound messages and a set of rules for source routing messages. When a message which originated from outside the network is received by such a router, the router determines if it is a source routed message. If it is, the router blocks the message if the source routing blocking rule is activated. If blocking is not activated, the router allows the source routed message through to the network. If the message is not a source routed message, the router evaluates the parameters of the message in view of the rules for receiving messages from sources external to the network. However, a router vulnerability exists where the rules used by the router are only compared to messages that are not source routed and the source routed blocking rule is not activated. In this situation, the router permits source routed messages through without comparing them to the filtering rules. In such a case, a computer external to the network may be able to bypass the external sync message filter and establish a communication connection with a computer on the network by using source routed messages.

A typical secure computer network has an interface for receiving and transmitting data between the secure network and computers outside the secure network. A plurality of network devices are typically behind the firewall. The interface may be a modem or an Internet Protocol (IP) router. Data received by the modem is sent to a firewall. Although the typical firewall is adequate to prevent outsiders from accessing a secure network, hackers and others can often breach a firewall. This can occur by a variety of methods of cyber attack which cause the firewall to permit access to an unauthorized user. An entry by an unauthorized computer into the secured network, past the firewall, from outside the secure network is called an intrusion. This is one type of unauthorized operation on the secure computer network.

There are systems available for determining that a breach of computer security has occurred, is underway, or is beginning. These systems can broadly be termed "intrusion detection systems". Existing intrusion detection systems can detect intrusions and misuses. The existing security systems determine when computer misuse or intrusion occurs. Computer misuse detection is the process of detecting and reporting uses of processing systems and networks that would be deemed inappropriate or unauthorized if known to responsible parties, administrators, or owners. An intrusion is an entry to a processing system or network by an unauthorized outsider.

Misuse detection and reporting research has followed two basic approaches: anomaly detection systems and expert systems.

Anomaly detection systems look for statistically anomalous behavior. Statistical scenarios can be implemented for user, dataset, and program usage to detect "exceptional" use of the system. Since anomaly detection techniques do not directly detect misuse, they do not always detect most actual misuses. The assumption that computer misuses would appear statistically anomalous has been proven unreliable. When recordings or scripts of known attacks and misuses are replayed on computers with statistical anomaly detection systems, few if any of these scripts are identified as anomalous. This occurs for a variety of reasons which reduce the indirect detection accuracy.

In general, anomaly detection techniques cannot detect particular instances of misuses unless the specific behaviors associated with those misuses also satisfy statistical tests (e.g., regarding network data traffic or computer system activity) without security relevance. Anomaly detection techniques also produce false alarms. Most of the reported anomalies are purely coincidental statistical exceptions and do not reflect actual security problems. These false alarms often cause system managers to resist using anomaly detection methods because they increase the processing system workload and need for expert oversight without substantial benefits.

Another limitation with anomaly detection approaches is that user activities are often too varied for a single scenario, resulting in many inferred security events and associated false alarms. Statistical measures also are not sensitive to the order in which events occur, and this may prevent detection of serious security violations that exist when events occur in a particular order. Scenarios that anomaly detection techniques use also may be vulnerable to conscious manipulation by users. Consequently, a knowledgeable perpetrator may train the adaptive threshold of detection system scenarios over time to accept aberrant behaviors as normal. Furthermore, statistical techniques that anomaly detection systems use require complicated mathematical calculations and, therefore, are usually computationally expensive.

Expert systems (also known as rule-based systems) have had some use in misuse detection, generally as a layer on top of anomaly detection systems for interpreting reports of anomalous behavior. Since the underlying model is anomaly detection, they have the same drawbacks of anomaly detection techniques. Expert systems attempt to detect intrusions by taking surveillance data supplied by a security system of the computer installation and by applying knowledge thereto relating to potential scenarios for attacking the computer installation. This is not fully satisfactory either, since that method only detects intrusions that correspond to attack scenarios that have previously been stored.

In contrast to the two research approaches, most recent practical attempts at detecting misuse have relied on a signature or pattern-detection mechanism with a signature being the set of events and transitions/functions that define the sequence of actions that form an attack or misuse. A signature mechanism uses network sensors to detect data traffic or audit trail records typically generated by computer operating systems. The designer of the product which incorporates the mechanism selects a plurality of events that together form the signature or the attack or misuse. Although the signature mechanism goes a step beyond expert systems, it is similar to an expert system because it relies upon signatures or rules.

Importantly, intrusion detection methods used today are plagued by false positive events, and the inability to detect the earliest stages of network attacks. Conventional intrusion detection techniques are based on specialized equipment located at a specific customer's premises and hence cannot see the hacker's activities over a broader scale. A need exists for an intrusion detection system which can provide early warning of potential misuses and intrusions with greater knowledge than can be obtained from detection at a single customer's premises. Early warning can be provided by specially examining detection events over a broader scale or scope, i.e., that of many aggregated customers or of the intervening network.

Intrusion detection products and services presently available are directed to the analysis of a single customer's data to determine intrusion events, but lack the capability to perform broad-scope intrusion analysis/detection.

It is readily apparent that the design, implementation, and limitations of conventional firewalls has rendered them highly vulnerable to hacker attack. What is needed is an improved firewall functionality or system that overcomes the foregoing disadvantages and is resistant to hacker attack.

It is also readily apparent that the design, implementation, and limitations of conventional intrusion/misuse detection systems has rendered them unreliable and inefficient. Furthermore, these intrusion detection systems are vulnerable to hacker techniques which render them insensitive to misuse. What is needed is an improved intrusion detection functionality or system that overcomes the foregoing disadvantages and is resistant to hacker attack.

In security, there is a trade-off between safety and other conflicting goals such as usability, usefulness, allowed features, freedom of action, etc. Firewalls currently must be configured non-optimally, i.e., at one extreme of the security trade-off since they cannot react to the current and/or future security environment, and lacking this ability, security must err on the side of safety. Without knowledge of the current (and potentially the expected/predicted) security forecast, the firewall must be configured for the worst-case scenario. But in reality, the security forecast is seldom so extreme. Thus, the firewall should ideally be configured much of the time on a less strict basis, allowing many additional services to be opened through the firewall which, although adding potential vulnerabilities, also add considerable value for the user and the organization/enterprise. However, if this somewhat lax configuration is maintained even in the face of attacks, when the potential vulnerabilities introduced by the presence of the valuable services are much more likely to be exploited, then overall security is lost. So it is desirable for security in this case to have the ability to rapidly respond in the appropriate manner to deteriorating forecast conditions by closing the firewalls (i.e., adding the required firewall filtering) when the situation deteriorates. Feedback to security devices from broad-scope monitoring is needed to make such optimal configuration control/adjustment possible, thereby solving the current problems and thus improving the value of security by avoiding the need for excessive "worst-casebased" restrictions.

SUMMARY OF THE INVENTION

The present invention is directed to a system and method for broad-scope intrusion detection. The system analyzes traffic coming into multiple hosts or other customers' computers or sites. This provides additional data for analysis as compared to systems that just analyze the traffic coming into one customer's site (as a conventional intrusion detection system does). Therefore, additional detection schemes can be used to recognize patterns that would otherwise be difficult or impossible to recognize with just a single customer detector. Standard signature detection methods can be used. Additionally, new signatures and methods/algorithms can be used based on broad-scope analysis goals.

Other embodiments of the present invention are directed to a system and method of alerting a device in a networked computer system comprising a plurality of devices to an anomaly. An anomaly is detected in the computer system, and then it is determined which devices or devices are anticipated to be affected by the anomaly in the future. These anticipated devices are then alerted to the potential for the future anomaly. The anomaly can be an intrusion or an intrusion attempt or reconnaissance activity.

According to aspects of the invention, the devices are polled in a predetermined sequential order, and a device anticipated to be affected by the anomaly is a device that has not been polled.

According to other aspects of the invention, an anomaly warning is transmitted from a first device to a central analysis engine, responsive to detecting the anomaly at the first device. Preferably, the anomaly warning comprises a unique device identifier.

According to further aspects of the invention, detecting the anomaly comprises analyzing a plurality of data packets with respect to predetermined patterns. Analyzing the data packets can comprise analyzing data packets that have been received at at least two of the plurality of devices including the first device.

According to further aspects of the invention, alerting the device comprises alerting a firewall associated with the device that an anomaly has been detected. Moreover, the device that is anticipated to be affected by the anomaly can be controlled (e.g., have its firewall adjusted).

The foregoing and other aspects of the present invention will become apparent from the following detailed description of the invention when considered in conjunction with the accompanying drawings.

DESCRIPTION OF EXEMPLARY EMBODIMENTS AND BEST MODE

The invention uses components, such as a computer system with a multi-tasking operating system, a network interface card, and network surveillance software, acting together to provide system functionality. This combination of hardware and software attached to a network is described more fully below and will perform the processes described below.

Figure 1:
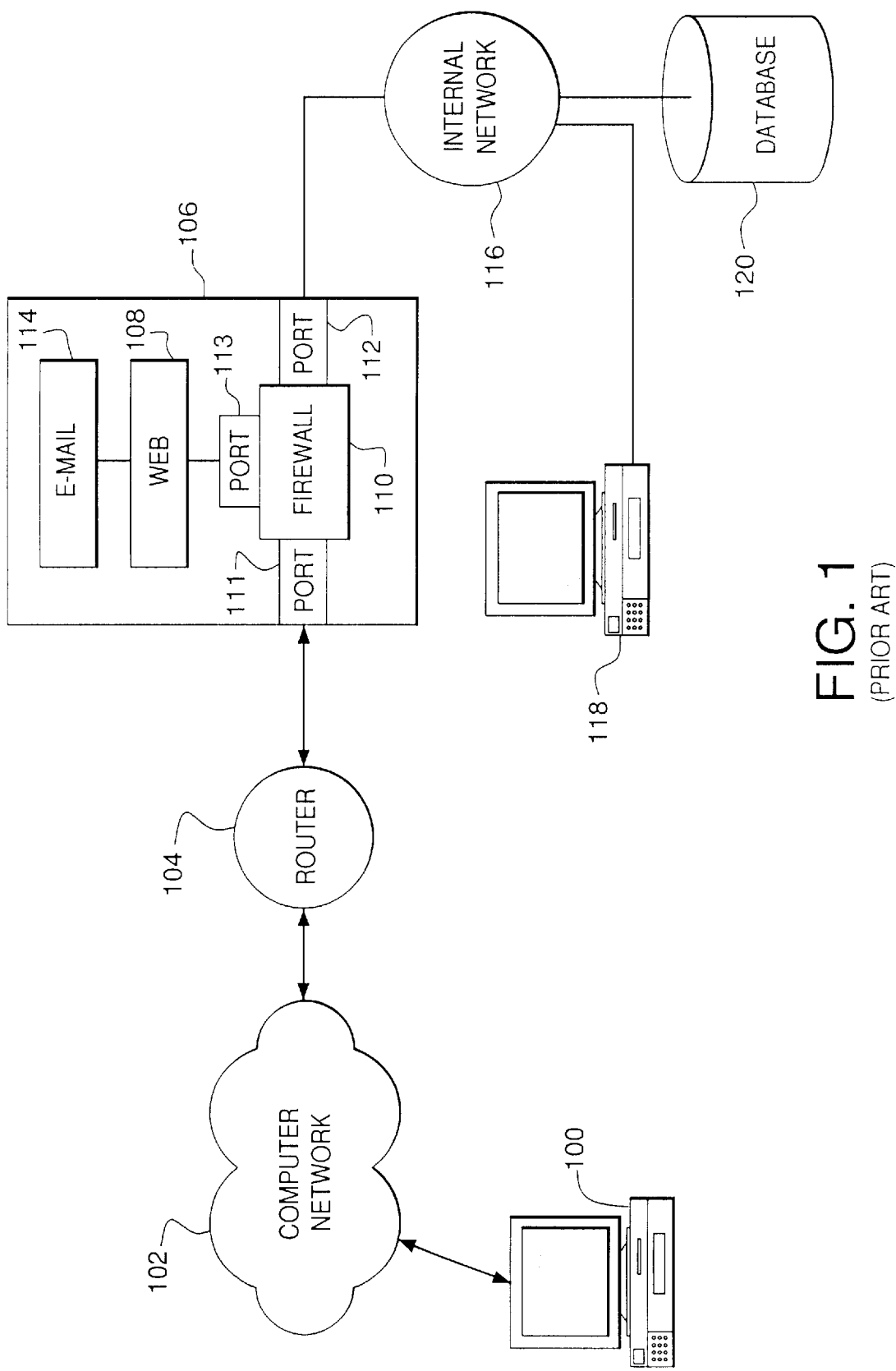
FIG. 1 depicts a computer network arrangement having a conventional firewall arrangement.
Figure 2:
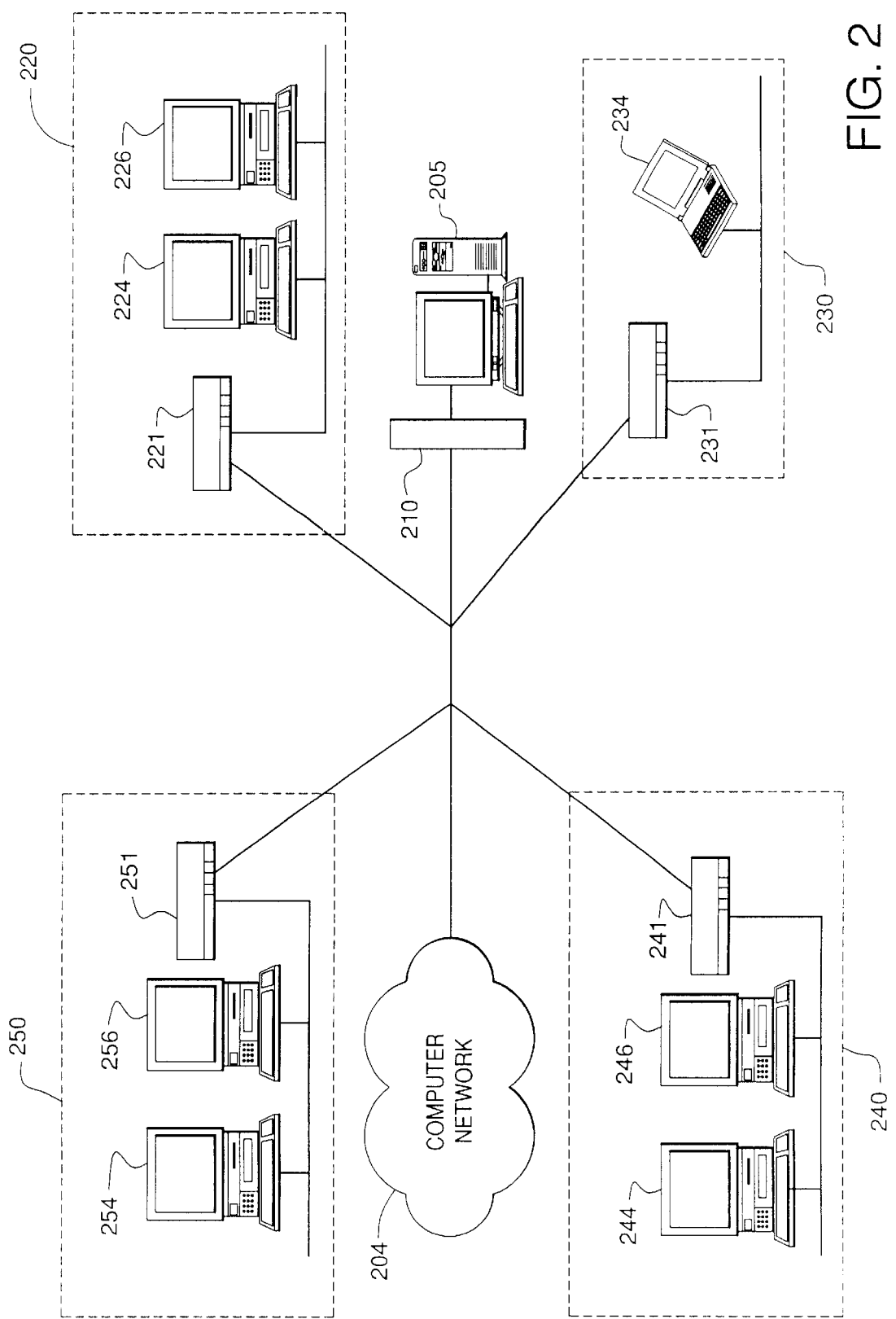
FIG. 2 shows in, schematic form, a computer network system including an intrusion detection system in accordance with the present invention.

FIG. 2 shows in, schematic form, a computer network-system including an intrusion detection system in accordance with the present invention. A plurality of network devices such as hosts, servers, and personal computers attached within customer site networks (shown here as customer site networks 220, 230, 240, 250), are shown coupled to an intervening computer network 204, such as a public network like the Internet. Routers (not shown) are typically used in the coupling. The customer site networks represent "internal" protected networks local to a particular corporation or site, for example. The customer site networks may or may not be publicly accessible or may comprise a publicly accessible network and an internal "private" network. Each customer site network or LAN (Local Area Network) comprises one or more hosts (e.g., customer site network 220 is shown with hosts 224, 226; customer site network 230 is shown with host 234; customer site network 240 is shown with hosts 244, 246; and customer site network 250 is shown with hosts 254, 256). Each site network is connected to the intervening computer network 204 via a firewall (e.g., host 220 is shown with firewall 221; host 230 is shown with firewall 231; host 240 is shown with firewall 241; and host 250 is shown with firewall 251).

A firewall connects the network 204 to an internal network. The firewall is a combination hardware and software buffer that is between the internal network and external devices outside the internal computer network. The firewall allows only specific kinds of messages to flow in and out of the internal network. As is known, firewalls are used to protect the internal network from intruders or hackers who might try to break into the internal network. The firewall is coupled to an interface (not shown). The interface is external to the internal network and can be a modem or an Internet Protocol (IP) router and serves to connect the internal network to devices outside the internal network.

A separately maintained data collection and processing center, comprising a computer or server 205 with firewall 210, is also coupled to the computer network. Although the data collection and processing center is implemented as a network device which is part of a wired local network, it is also envisioned as possibly being connected to the network 204 by a wireless link.

Each network device can be considered a node because each device has an addressable interface on the network. As can be appreciated, many other devices can be coupled to the network including additional personal computers, mini-mainframes, mainframes and other devices not illustrated or described which are well known in the art.

The system performs broad-scope intrusion detection by monitoring the communications on a network or on a particular segment of the network. The data collection and processing center receives information from the various network devices attached to the computer network 204. For example, all communications sent to each host 220, 230, 240, 250 are forwarded to, or otherwise captured by, the data collection and processing center. Thus, the data collection and processing center receives all communications (i.e., the data) originating from a user on the computer network 204 and flowing to host 220 (and vice versa), for example, as well as all communications originating from the computer network 204 and flowing to all other hosts (and vice versa).

It should be noted that certain devices can be used as sensors to sense data traffic and pass their findings on to the data collection and processing center or other central processing system, and other separate devices may include computer hosts, firewalls, and other systems which may be the potential targets of attack by a hacker, and/or may be adjusted in response to detected attacks, either manually or automatically.

The present invention is usable on such networks as ARCnet, Ethernets and Token-Ring networks, wireless networks, among other network types. The network, in this example, has a network cable, also known as media, which may be of any known physical configuration including unshielded twisted pair (UTP) wire, coaxial cable, shielded twisted pair wire, fiber optic cable, and the like. Alternatively, the network devices could communicate across wireless links.

The system of the present invention is designed and intended to operate compatibly on networks which communicate using the Transmission Control Protocol/Internet Protocol (TCP/IP) standard, although other communications standards (or even proprietary protocols) could be used. Network TCP/IP data is packetized, and sent in frames which are structured to be compatible with any network device which complies with the TCP/IP standards. A typical frame or packet transmitted across the Internet contains a preamble, destination address, source address, type field, data field, and a cyclical redundancy check (CRC). The preamble contains data used by the communicating computer systems to synchronize or handshake. Destination and source Internet Protocol (IP) addresses represent the principals communicating and the packet type indicates the type of communication. The data field contains the actual information content of the dialogue. The CRC is an integrity check facilitated between the two systems participating in the conversation.

The present invention provides aggregate traffic/intrusion monitoring in the provider network. This allows for a broader scope of network activity to be considered and analyzed, not just relevant to a single customer, but across some or all customers. The additional data is valuable because the probing/reconnaissance activities of would-be intruders typically cover a large number of customers, so as to select those with security weaknesses for more in-depth attack. Additional patterns of broadly suspicious activity can thus be correlated/recognized across many customers.

The present invention uses a multi-stage technique in order to improve intrusion detection efficacy and obtain broader scope detection. First, suspicious network traffic events are collected (potentially in context) and forwarded to a central database and analysis engine, then the centralized engine uses pattern correlations across multiple customer's events in order to better determine the occurrence and sources of suspected intrusion-oriented activity prior to actually alarming. Second, upon detection of suspected reconnaissance and probing, the detection process can adjust its matching parameters and alarm thresholds to focus sensitivity on attacks from suspected sources (hackers) against specific targets (customers). Third, actual occurrence of anticipated attacks against specific targets can be used to adjust the broad-scope matching parameters, providing both positive and negative feedback which selectively adjusts specific pattern sensitivity. This process is different from conventional approaches, in that a broader scope of data is utilized in new ways. It should be noted that, in addition to multistage techniques, the present invention can implement monolithic techniques in which a broad scope of customers' events are correlated at a central analysis engine.

The system analyzes traffic coming into multiple hosts or other customer's computers or sites. This provides additional data for analysis as compared to systems that just analyze the traffic coming into one customer's site (as a typical firewall does). Therefore, additional detection schemes can be used to recognize patterns that would otherwise be difficult or impossible to recognize with just a single customer detector. Standard scanning patterns can be used for the data as well, such as sequential or pseudorandom techniques.

The data collection and processing center collects data from multiple or all the customers and analyzes the data. In this manner, the number of false alarms is decreased (because multiple occurrences of an activity may trigger an alarm, but the present invention can scan a large number of customers, so certain types of harmless activity that otherwise would be perceived as a threat can be viewed and discounted as not a threat). Moreover, predictions can be made about future events that may affect customers in the sequence. Thus, the present invention can be used to block future hacks and determine the source address of the hacker.

The present invention monitors the traffic from a plurality of customers. Different types of algorithms can be used to look for different types of patterns that would not be recognizable by a conventional intrusion detection system at a single customer site. The algorithms preferably reside in a back end data center. Data from existing customer's conventional intrusion detection system is provided to the central database and then analyzed. Data records comprise, for example, a time-stamp, a description of the activity, and the source of the probe.

Figure 3:
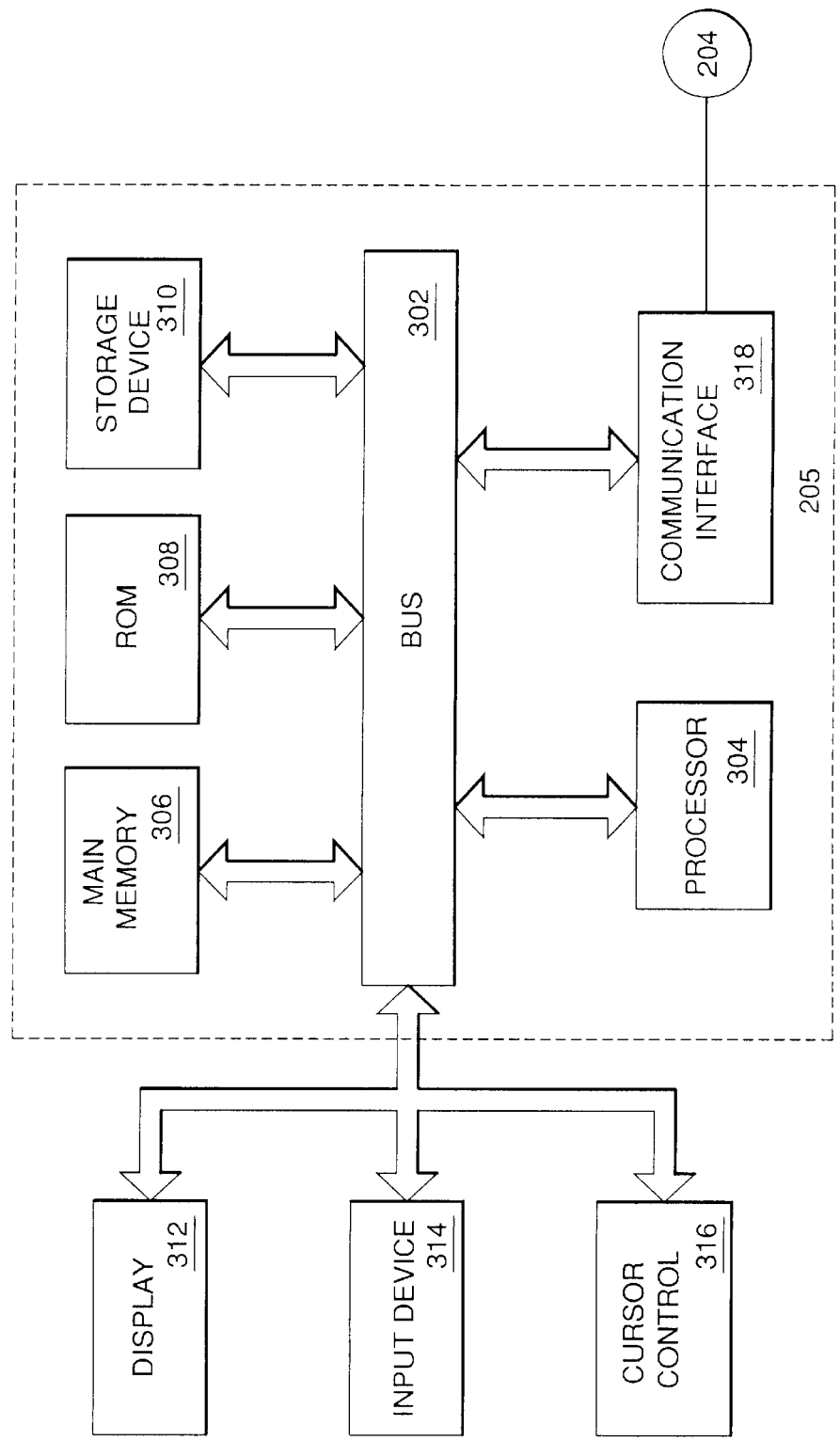
FIG. 3 is a detailed block diagram of an exemplary computer system with which the present invention can be used.

FIG. 3 is a detailed block diagram of an exemplary computer system 205 of a data collection and processing center with which the present invention can be used. The system includes a bus 302 or other communication mechanism for communicating information, and a processor 304 coupled with the bus 302 for processing information. The system also includes a main memory 306, such as a random access memory (RAM) or other dynamic storage device, coupled to the bus 302 for storing information and instructions to be executed by processor 304. Main memory 306 also may be used for storing temporary variables or other intermediate information during execution of instructions to be executed by processor 304. The system further includes a read only memory (ROM) 308 or other static storage device coupled to the bus 302 for storing static information and instructions for the processor 304. A storage device 310, such as a magnetic disk or optical disk, is provided and coupled to the bus 302 for storing information and instructions.

The system 205 may be coupled via the bus 302 to a display 312, such as a cathode ray tube (CRT) or a flat panel display, for displaying information to a computer user. An input device 314, including alphanumeric and other keys, is coupled to the bus 302 for communicating information and command selections to the processor 304. Another type of user input device is cursor control 316, such as a mouse, a trackball, or cursor direction keys for communicating direction information and command selections to processor 304 and for controlling cursor movement on the display 312.

The system 205 also includes a communication interface 318 coupled to the bus 302. Communication interface 318 provides a two-way data communication as is known. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Furthermore, the communication interface 318 may be coupled to the network cable 302. Wireless links may also be implemented. In any such implementation, communication interface 318 sends and receives electrical, electromagnetic or optical signals which carry digital data streams representing various types of information. Of particular note, the communications through interface 318 permits the transmission or receipt of broad-scope intrusion detection information. The system 205 receives data from each of the nodes being monitored on the network.

The system 205 collects the data, filters the data, and processes the data to provide security indications and warnings.

The processor 304 can execute sequences of instructions contained in the main memory 306. Such instructions may be read into main memory 306 from another computer-readable medium, such as storage device 310. However, the computer-readable medium is not limited to devices such as storage device 310. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 306 causes the processor 304 to perform the process steps described below. In alternative embodiments, hard-wired circuitry may be used in place of or in combination with software instructions to implement the invention. Thus, embodiments of the invention are not limited to any specific combination of hardware circuitry and software.

Figure 4:
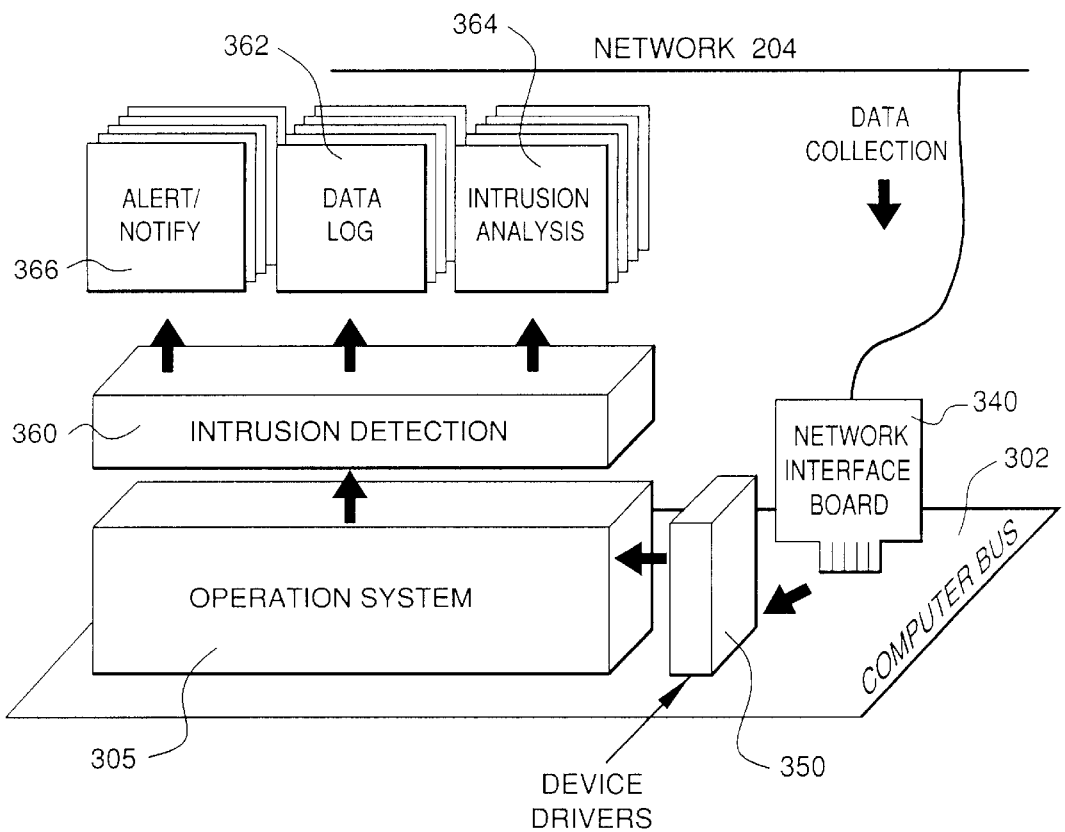
FIG. 4 shows in block form aspects of the intrusion detection system in accordance with the present invention.

FIG. 4 shows in block form aspects of the system 205 in accordance with the present invention. The intrusion detection portion of the system receives data from the various intrusion detection systems on the network and analyzes this data to detect an attempted intrusion or an intrusion or reconnaissance activity. The data is logged and analyzed. If an intrusion is detected, an alert is logged.

The broad-scope intrusion monitoring system operates through a computer, attached to the network, in the preferred embodiment by an interface card or network interface board 340. In the preferred embodiment, the network interface board 340 contains a preset and unique identifier such as an Internet address or a hardware address. The unique address provides the means for an attached computer system to identify intended packets and ignore the rest, as is well known in the art. The system utilizes standard device drivers 350 to forward all packets into the host 205 from the network 204 regardless of the address in the packets. Preferably, the system is transparent and inaccessible to an intruder, thereby preserving the authenticity of the logged entries made by the system. To this end, encryption and authentication means can be used, as known to those skilled in the art.

The system preferably monitors the network traffic substantially in its entirety. Upon receipt of the network packets, the interface board 340 passes the packet and all data contained within to the operating system 305 of the system computer. Once there, it is stored in memory (e.g., memory 306) awaiting entry to the next phase which is the intrusion detection process 360, described below. In the intrusion detection process, the data is first logged into a data log 362. The data is then analyzed 364, and alerts or notifications 366 are thereafter generated.

The computer equipment configuration which may be used in the preferred embodiment may be, for example, conventional computer running a conventional operating system, available as commercial-off-the-shelf products as known to one skilled in the art.

Figure 5:
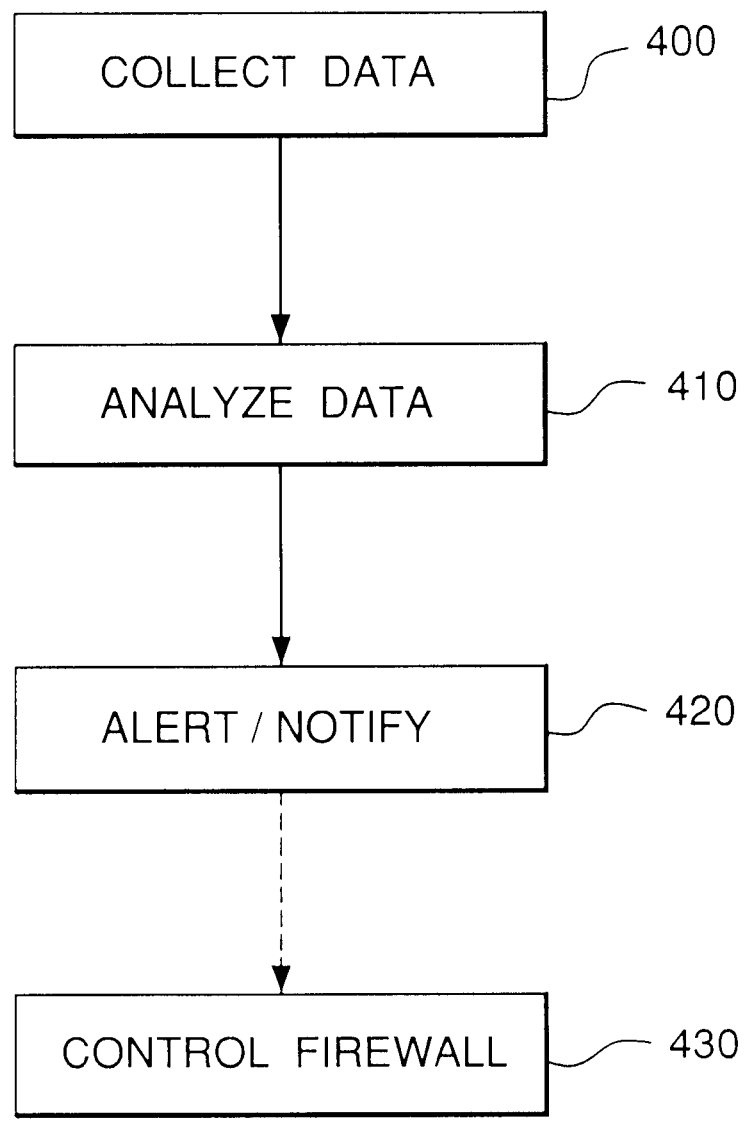
FIG. 5 shows a flow chart of an exemplary intrusion detection method in accordance with the present invention.

FIG. 5 shows a flow chart of an exemplary intrusion detection method in accordance with the present invention. At step 400, data is collected or otherwise received at the data collection and processing center from the sensors coupled to the network, whether they be computers or special-purpose devices. Preferably, the data is collected in a predetermined order from the hosts. At step 410, the data is analyzed to determine if any intrusions have been (or are being) attempted. At step 420, if any intrusions or attempted intrusions or reconnaissance activity have been detected, the appropriate alerts or notifications are transmitted to the pertinent administrators of the hosts on the network. In this manner, the administrators, and thereby the hosts for which they are responsible, can be prepared for an incoming intrusion, or can take other precautions against future intrusions, or can check their systems to determine if any access was gained in previous intrusion attempts. Because the data is determined in a predetermined order from the sensors, an intrusion attempt that is detected at an earlier, already polled sensor, can be determined and administrators of other hosts, that have not yet been hit by the intrusion attempt, can be alerted about the possibility of such an intrusion attempt. Thus, the present invention gathers and exploits intrusion monitoring data related to many customers rather than just a single customer, thereby reducing inaccurate declarations of intrusion events and more readily detecting the earliest stages of attempted attacks.

It is contemplated that feedback from the broad-scope intrusion detection system is provided to firewalls, secondary (narrow-scope) intrusion detection system devices, hosts (computers), routers, etc. so that the associated firewalls can adjust in response to expected attacks determined to be forthcoming by the intrusion detection system. Such feedback to customer site devices (of all sorts, and especially the firewalls) is useful to enhance security. Such feedback can also be provided to a service provider's network to further deter the attack.

To prevent this approach from itself being attacked, exploited, or fooled by hackers, secure feedback connectivity could be accomplished using encrypted communication via either specially-designed encrypting methods or tunneled via standards such as IPsec (IETF "IP security" standard) or SSL ("secure sockets layer") or SSH ("secure shell"), which provide authentication and encryption functions to secure the transmitted feedback or "configuration change" data. Via the encrypting protocol or inside the encrypted "tunnel," standard data transfer protocols such as FTP could be used to actually transfer information and SNMP to collect/poll status (additionally or alternately, CORBA objects or JAVA programs or applets could be transferred back and forth). These are exemplary methods, and proprietary protocols rather than standards could also be used. These could be done on virtually any sort of network.

Each device and each type of device being controlled/adjusted/reconfigured preferably has that capability in software, which could be done via a device driver or API (application programming interface) or other technical means which allows control or adjustment. It is contemplated that, in addition to notifying the firewall or other host device of an impending attack, the system could control the firewall or other host device to reconfigure or adjust pertinent parameters in anticipation of the attack, at optional step 430. For each type of device, the parameters or items controlled/adjusted would be different (e.g., filtering parameters/rules for firewalls, allowed services and open ports for hosts, detection parameters or "extent of detection" parameters for intrusion detection system devices, etc.). The present invention provides the ability to detect pre-attack events—this provides lead time to adjust the firewall (or other device) parameters on each of a plurality of hosts before the actual attack occurs. Adjustments after the fact are a less desirable way to maintain security. The broad-scope intrusion detection system algorithms and operation can be adjusted and tuned to specifically gather the information needed to specify the configuration changes/adjustments needed.

Conventional intrusion detection systems merely provide indications of already occurred hacker events and attacks. There is no functionality or capability present in conventional intrusion detection systems to determine near-real-time parameter adjustments for firewalls, etc. which solve the problem. Even if a conventional intrusion detection system was improved so that it could adjust firewall parameters based on what it detects, this adjustment would necessarily happen after the attack, and thus be of little value.

It should be understood that the inventive principles described in this application are not limited to the components or configurations described in this application. It should be understood that the principles, concepts, systems, and methods shown in this application may be practiced with software programs written in various ways, or different equipment than is described in this application without departing from the principles of the invention.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A method of alerting at least one device in a networked computer system comprising a plurality of devices to an anomaly, at least one of the plurality of devices having a firewall, comprising:

detecting an anomaly in the networked computer system using network-based intrusion detection techniques comprising analyzing data entering into a plurality of hosts, servers, and computer sites in the networked computer system;

determining which of the plurality of devices are anticipated to be affected by the anomaly by using pattern correlations across the plurality of hosts, servers, and computer sites; and alerting the devices that are anticipated to be affected by the anomaly.

2. The method of claim 1, further comprising:

determining which of the plurality of devices have been affected by the anomaly; and alerting the devices that have been affected by the anomaly.

3. The method of claim 1, further comprising adjusting the firewall of each of the devices that is anticipated to be affected by the anomaly responsive to the detection of the anomaly.

4. The method of claim 1, wherein the anomaly comprises one of an intrusion and an intrusion attempt.

5. The method of claim 1, wherein detecting the anomaly comprises analyzing a plurality of data packets with respect to predetermined patterns.

6. The method of claim 5, wherein analyzing the data packets comprises analyzing data packets that have been received at at least two of the plurality of devices.

7. The method of claim 1, wherein detecting the anomaly comprises recognition of an intrusion and further comprising generating an automated response to the intrusion.

8. The method of claim 1, further comprising adjusting anomaly detection sensitivity and alarm thresholds based on the detected anomaly.

9. A method of alerting a device in a networked computer system comprising a plurality of devices to an anomaly, comprising:

detecting an anomaly at a first device in the computer system using network-based intrusion detection technicques comprising analyzing data entering into a plurality of hosts, servers, and computer sites in the networked computer system;

determining a device that is anticipated to be affected by the anomaly by using pattern correlations across the plurality of hosts, servers, and computer sites; and alerting the device that is anticipated to be affected by the anomaly.

10. The method of claim 9, wherein the plurality of devices are polled in a predetermined sequential order, the first device being polled prior to detecting the anomaly, and the device anticipated to be affected by the anomaly is a device that has not been polled.

11. The method of claim 9, further comprising transmitting an anomaly warning from the first device to a central analysis engine, responsive to detecting the anomaly at the first device, the anomaly warning comprising a unique device identifier.

12. The method of claim 9, wherein the anomaly comprises one of an intrusion and an intrusion attempt.

13. The method of claim 9, wherein detecting the anomaly comprises analyzing a plurality of data packets with respect to predetermined patterns.

14. The method of claim 13, wherein analyzing the data packets comprises analyzing data packets that have been received at at least two of the plurality of devices including the first device.

15. The method of claim 9, wherein alerting the device comprises alerting a firewall associated with the device that the anomaly has been detected.

16. The method of claim 9, wherein alerting the device comprises generating and transmitting an electronic notification to one of the device and an administrator of the device.

17. The method of claim 9, further comprising controlling the device that is anticipated to be affected by the anomaly.

18. The method of claim 9, further comprising adjusting anomaly detection sensitivity and alarm thresholds based on the detected anomaly.

19. An intrusion detection and alerting system for a computer network comprising:
   a plurality of devices coupled to the computer network, each device adapted to at least one of: (1) sense data and provide the data to a data collection and processing center, and (2) be adjustable; and
   the data collection and processing center comprising a computer with a firewall coupled to the computer network, the data collection and processing center monitoring data communicated to at least a portion of the plurality of devices coupled to the network, detecting an anomaly in the network using network-based intrusion detection techniques comprising analyzing data entering into a plurality of hosts, servers, and computer sites in the networked computer system, determining which of the devices are anticipated to be affected by the anomaly by using pattern correlations across the plurality of hosts, servers, and computer sites, and alerting the devices.

20. The system of claim 19, wherein the data collection and processing center further determines which of the devices have been affected by the anomaly and alerts the devices.

21. The system of claim 19, wherein at least one of the plurality of devices comprises a firewall, and the data collection and processing center further adjusts the firewall of each of the devices that is anticipated to be affected by the anomaly responsive to the detection of the anomaly.

22. The system of claim 19, wherein the anomaly comprises one of an intrusion, an intrusion attempt, and reconnaissance activity.

23. The system of claim 19, wherein the data collection and processing center detects the anomaly by analyzing a plurality of data packets with respect to predetermined patterns.

24. The system of claim 23, wherein the data collection and processing center analyzes data packets that have been received by at least two of the plurality of devices.

25. The system of claim 19, wherein the data collection and processing center adjusts anomaly detection sensitivity and alarm thresholds based on the detected anomaly.

26. A data collection and processing center comprising a computer with a firewall coupled to a computer network, the data collection and processing center monitoring data communicated to the network, and detecting an anomaly in the network using network-based intrusion detection techniques comprising analyzing data entering into a plurality of hosts, servers, and computer sites in the networked computer system.

27. The data collection and processing center of claim 26, further comprising determining which of a plurality of devices that are connected to the network are anticipated to be affected by the anomaly by using pattern correlations across the plurality of hosts, servers, and computer sites, and alerting the devices.

28. The data collection and processing center of claim 26, wherein the data collection and processing center further determines which of a plurality of devices that are connected to the network have been affected by the anomaly and alerts the devices.

29. The data collection and processing center of claim 26, wherein the data collection and processing center further adjusts a firewall of each of a plurality of devices that is connected to the network that is anticipated to be affected by the anomaly responsive to the detection of the anomaly.

30. The data collection and processing of claim 26, wherein the anomaly comprises one of an intrusion, an intrusion attempt, and reconnaissance activity.

31. The data collection and processing of claim 26, wherein the data collection and processing center detects the anomaly by analyzing a plurality of data packets with respect to predetermined patterns.

32. The data collection and processing of claim 31, wherein the data collection and processing center analyzes data packets that have been received by at least two devices that are connected to the network.

33. The data collection and processing of claim 26, wherein the data collection and processing center adjusts anomaly detection sensitivity and alarm thresholds based on the detected anomaly.

* * * * *

UNITED STATES PATENT AND TRADEMARK OFFICE
CERTIFICATE OF CORRECTION

PATENT NO.   : 6,715,084 B2
DATED        : March 30, 2004
INVENTOR(S)  : Jeffrey A. Aaron and Thomas Anschutz It is certified that error appears in the above-identified patent and that said Letters Patent is hereby corrected as shown below:

Column 1,
Line 57, "P spoofing" should read -- IP spoofing --

Signed and Sealed this

Eighth Day of June, 2004

JON W. DUDAS
*Acting Director of the United States Patent and Trademark Office*